US005280282A

United States Patent [19]

Nagafusa et al.

[11] Patent Number: 5,280,282

[45] Date of Patent: Jan. 18, 1994

[54] REMOTE CONTROL SYSTEM

[75] Inventors: Makoto Nagafusa; Shinji Yoshida, both of Hamamatsu, Japan

[73] Assignee: Sanshin Kogyo Kabushiki Kaisha, Shizuoka, Japan

[21] Appl. No.: 662,367

[22] Filed: Feb. 28, 1991

[30] Foreign Application Priority Data

Feb. 28, 1990 [JP] Japan .................................. 2-50492

[51] Int. Cl.[5] .............................................. H04Q 1/00

[52] U.S. Cl. ............................ 340/825.5; 340/825.31; 180/321; 180/287

[58] Field of Search ........................ 340/825.5, 825.31; 114/144 R, 144 A; 440/84, 85, 86, 87; 361/192; 180/321, 287, 6.26, 6.3

[56] References Cited

U.S. PATENT DOCUMENTS 856,288 6/1907 Osborne .
2,702,615 2/1955 Morse .
2,869,861 1/1959 Carlson .
3,322,994 5/1967 Dever et al. .
3,644,816 2/1972 Gilbert .
4,004,537 1/1977 Nilsson .
4,020,713 5/1977 Cantley et al. .
4,079,906 3/1978 Durandeau et al. .
4,223,624 9/1980 Iyeta .
4,306,314 12/1981 Griffiths .
4,513,235 4/1985 Acklam et al. .
4,527,983 7/1985 Booth .
4,614,900 9/1986 Young .
4,718,869 1/1988 Fisher .
4,810,216 3/1989 Kawamura .
4,824,408 4/1989 Aertker et al. .
4,831,531 5/1989 Adams et al. .
4,836,809 6/1989 Pelligrino .
4,914,368 4/1990 Orton .
4,919,005 4/1990 Schleicher .
4,920,819 5/1990 Uchida et al. .
5,058,793 10/1991 Neville et al. .
5,072,361 12/1991 Davis et al. .
5,080,619 1/1992 Uchida et al. ........................ 440/84
5,124,696 6/1992 Bosley ........................... 340/825.31

FOREIGN PATENT DOCUMENTS 61-29068 8/1986 Japan .
1-224818 9/1989 Japan .
1-263707 10/1989 Japan .

*Primary Examiner*—Sandra L. O'Shea
*Assistant Examiner*—Brian Zimmerman
*Attorney, Agent, or Firm*—Ernest A. Beutler

[57] ABSTRACT

A remote control system for transmitting control movement to a controlled member, such as a throttle or transmission control lever on a marine propulsion unit, which includes an actuator unit having a lever arm for mechanically actuating the controlled member and an electric motor for electrically actuating the controlled member. A first remote control unit is provided which has a first operator mechanically connected to the lever arm for selectively transmitting movement to the lever arm upon movement of the first operator. There is also provided a second remote control unit having a second operator electrically connected to the electric motor through a central control unit for selectively transmitting an electrical signal to the central control unit for selectively transmitting movement to the electric motor upon movement of the second operator. Cables transmit movement of the lever arm and electric motor into movement of the controlled member while interlock switches and a locking mechanism preclude operation of the controlled member by one of the operators when the other of the operators is operated. The control state of the operators is indicated on selection display units.

7 Claims, 8 Drawing Sheets

Throttle control lever
Sub remote control unit
Control unit
Main remote control unit

REMOTE CONTROL SYSTEM

BACKGROUND OF THE INVENTION

This invention relates to a remote control system, and more particularly to an improved remote control system of a type which includes a plurality of separate operators, at least one of which may be selectively operated so as to mechanically actuate a controlled member and at least one of which may be selectively operated so as to electrically actuate the controlled member. There are provided a number of types of remote control systems which have been used in connection with a marine propulsion unit wherein two separately positioned operators may be employed to operate the same controlled member on the propulsion unit. For example, it is common practice on certain watercraft to have throttle/-shift control operators both at the bridge and in the cabin of the watercraft. When such arrangements are used, it is desirable to insure that only one operator can be operated at a time and that once the controlled member is being controlled from one location this control cannot be overridden, at the other location.

One type of fully mechanical remote control system has been proposed which utilizes wire cables to transmit the movement of either of a pair of remote control operators to a controlled member on the propulsion unit via a switchover device. An example of such an arrangement is set forth in Japanese utility model S61-29068. While this type of remote control system has certain advantages, it also has certain disadvantages associated with it. For example, the wire cables connecting the operators with the switchover device and connecting the switchover device with the controlled member on the propulsion unit increases the operating load of the system. Also, this type of system may require relatively long cables, depending on the location of the operators and the size of the watercraft. The longer the cables, the more likely they are to bend causing the remote control system to malfunction. Changing control smoothly from one location to the other has also been difficult with these wholly mechanically operated systems because it has typically been difficult for someone at one remote location in the watercraft to know the control state of the operator at the other location.

While an all electrical remote control system may decrease the system's operational load and may also decrease the system's tendency to malfunction as a result of cable bending, an all electrical remote control system is disadvantageous in that no means are provided on the watercraft for manually operating the controlled member should that become necessary to maintain control of the watercraft in the event of an electrical component or power failure.

It is, therefore, a principal object of this invention to provide an improved remote control system which eliminates or reduces the above disadvantages.

It is a further object of this invention to provide an improved remote control system which employs a plurality of separate remotely positioned operators, at least one of which is mechanically connected to manual actuating means for selectively actuating a controlled member and at least one of which is electrically connected to electric actuating means for selectively actuating that same controlled member.

SUMMARY OF THE INVENTION

This invention is adapted to be embodied in a remote control system for transmitting control movement to a controlled member, such as a throttle or transmission control lever. The remote control system comprises an actuator unit having manual actuating means and electric actuating means both operatively connected to the controlled member. In accordance with the invention, a first remote control unit is provided which has a first operator mechanically connected to the manual actuating means for selectively transmitting movement to the manual actuating means upon movement of the first operator There is also provided in accordance with the invention a second remote control unit having a second operator electrically connected to the electric actuating means through a central control unit for selectively transmitting an electrical signal to the central control unit for selectively transmitting movement to the electric actuating means upon movement of the second operator. The remote control system further includes means for transmitting movement of each of the actuating means into movement of the controlled member, interlock means for precluding operation of the controlled member by one of the operators when the other of the operators is operated, and means for indicating the control state of the operators.

DETAILED DESCRIPTION OF THE PREFERRED EMBODIMENTS OF THE INVENTION

Figure 1:
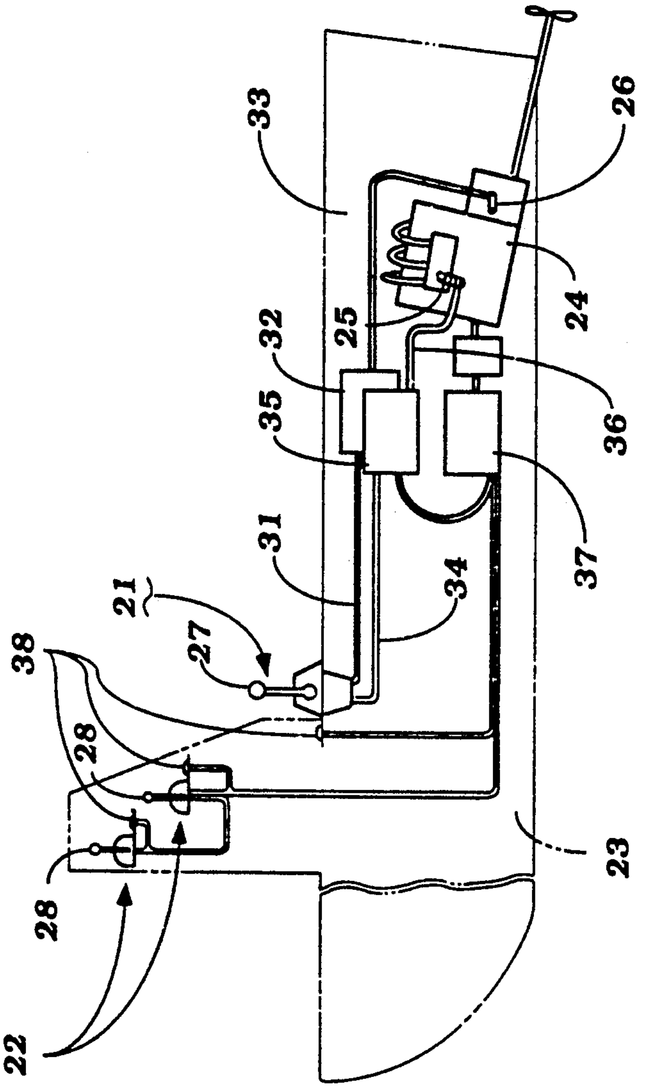
FIG. 1 is a partially perspective and partially schematic view of a remote control system for a marine propulsion unit and associated watercraft constructed in accordance with an embodiment of the invention.

Referring first to FIG. 1, a remote control system for operating a marine propulsion unit from either of two remote locations is depicted. A main remote control unit, indicated generally by the reference numeral 21, is positioned at one of these locations, and a sub-remote control unit, indicated generally by the reference number 22, is positioned at the other location. The main remote control unit 21 is preferably located in the cabin of an associated watercraft 23, and the sub-remote control unit 22 is preferably located on the bridge, although these locations can be reversed or other locations can be used. The remote control units 21 and 22 are provided for controlling a marine propulsion unit, identified generally by the reference numeral 24.

It should be noted that in the illustrated embodiments, the propulsion unit 24 comprises the outboard drive portion of an inboard/outboard drive unit; however, it may alternatively comprise an outboard motor. The propulsion unit 24 includes a powering internal combustion engine and a throttle control lever 25 that is adapted to control the speed of the engine in a known manner. In addition, there is provided a transmission control lever 26 that is designed to operate a conventional forward, neutral, reverse transmission of the type normally used with such propulsion units.

The main remote control unit 21 is comprised of a transmission/throttle control operator 27 while the sub-remote control unit 22 is comprised of a pair of transmission/throttle control operators 28, and further includes a switch 29 (see FIG. 4) for converting one of the operators 28 into a free accelerator lever for controlling the throttling of the engine and the starting of the engine without affecting the transmission position. The operators 27 and 28 are normally movable between a neutral position and forward and reverse drive positions. The neutral position also corresponds to an idle throttle position while the forward and reverse drive positions correspond to various throttle opening positions, ranging from partially to fully opened. When the switch 29 is activated, however, the affected operator 28 is movable only between an idle and a fully opened throttle position.

The operator 27 has a bowden wire cable 31 connected to it for operation of an actuator unit 32 which, in turn, actuates the transmission control lever 26 through an actuator cable 33. In a like manner, the operator 27 is also connected to another bowden wire cable 34 for operation of a second actuator unit 35 which, in turn, actuates the throttle control lever 25 via a bowden wire actuator 36.

Whereas the operator 27 is mechanically linked to the actuator units 32 and 35 through the cables 31 and 34, operators 28 are electrically connected to these actuator units 32 and 35 through a central control unit, identified by the reference numeral 37. The actuator units 32 and 35 are electrically controlled to effect movement of actuator cables 33 and 36 to actuate the levers 26 and 25 respectively.

Figure 3:
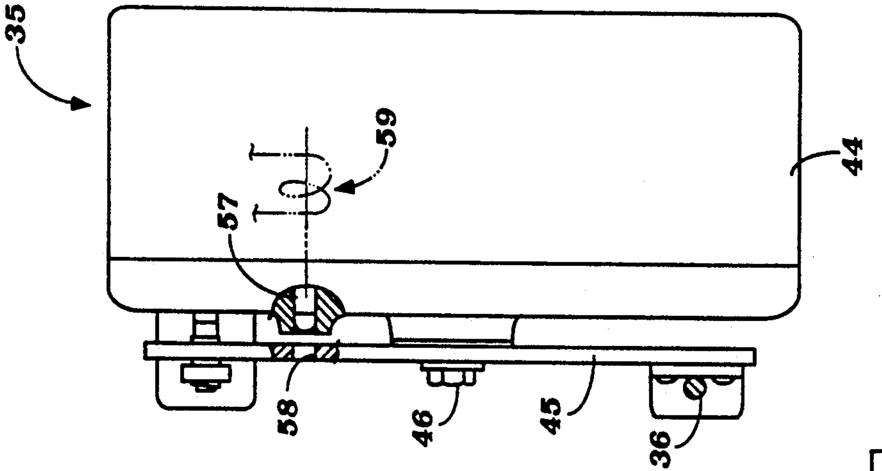
FIG. 3 is a right side view of the driving mechanism of FIG. 2.
Figure 2:
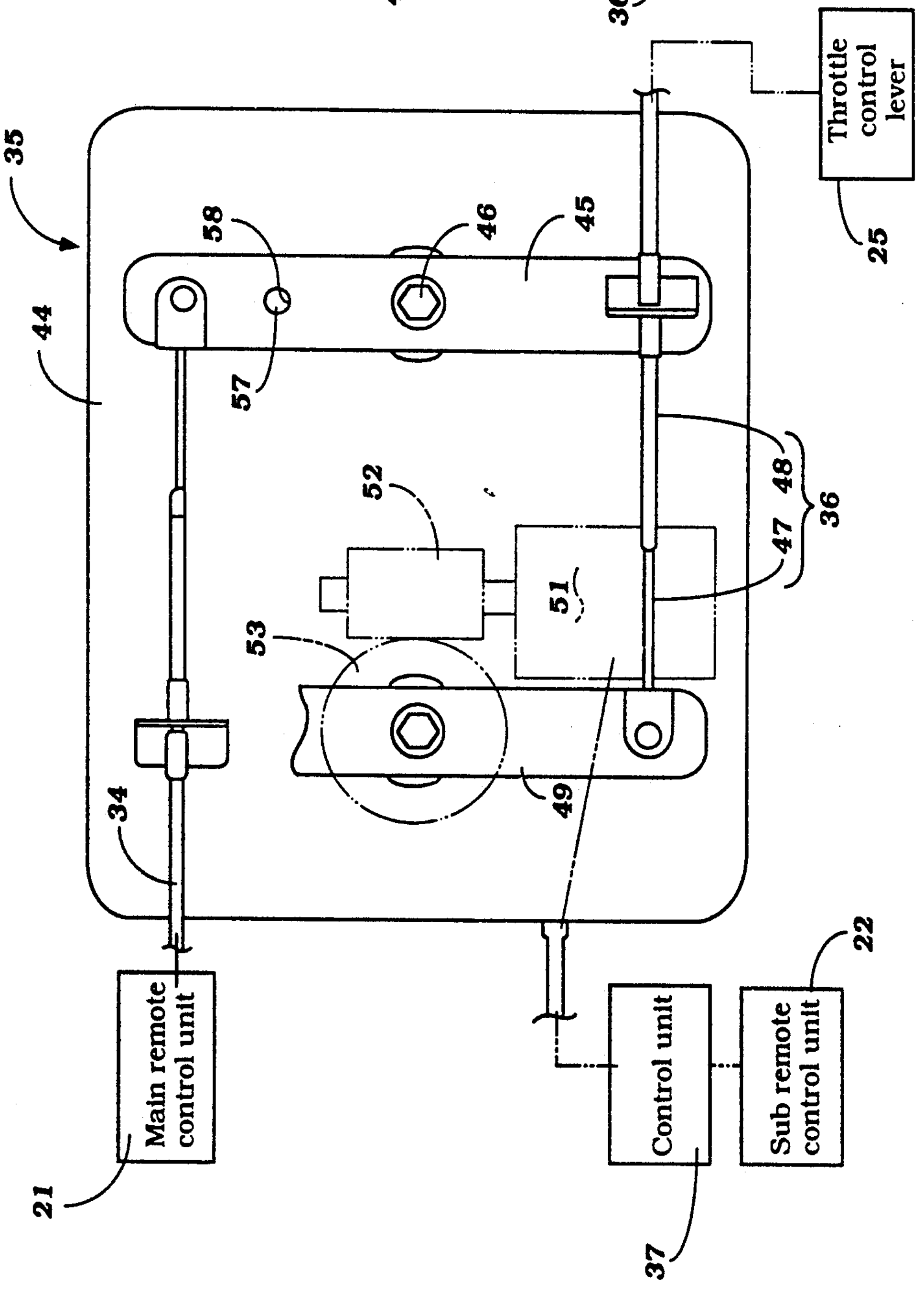
FIG. 2 is a frontal view of a first embodiment of the driving mechanism of the actuator unit.
Figure 4:
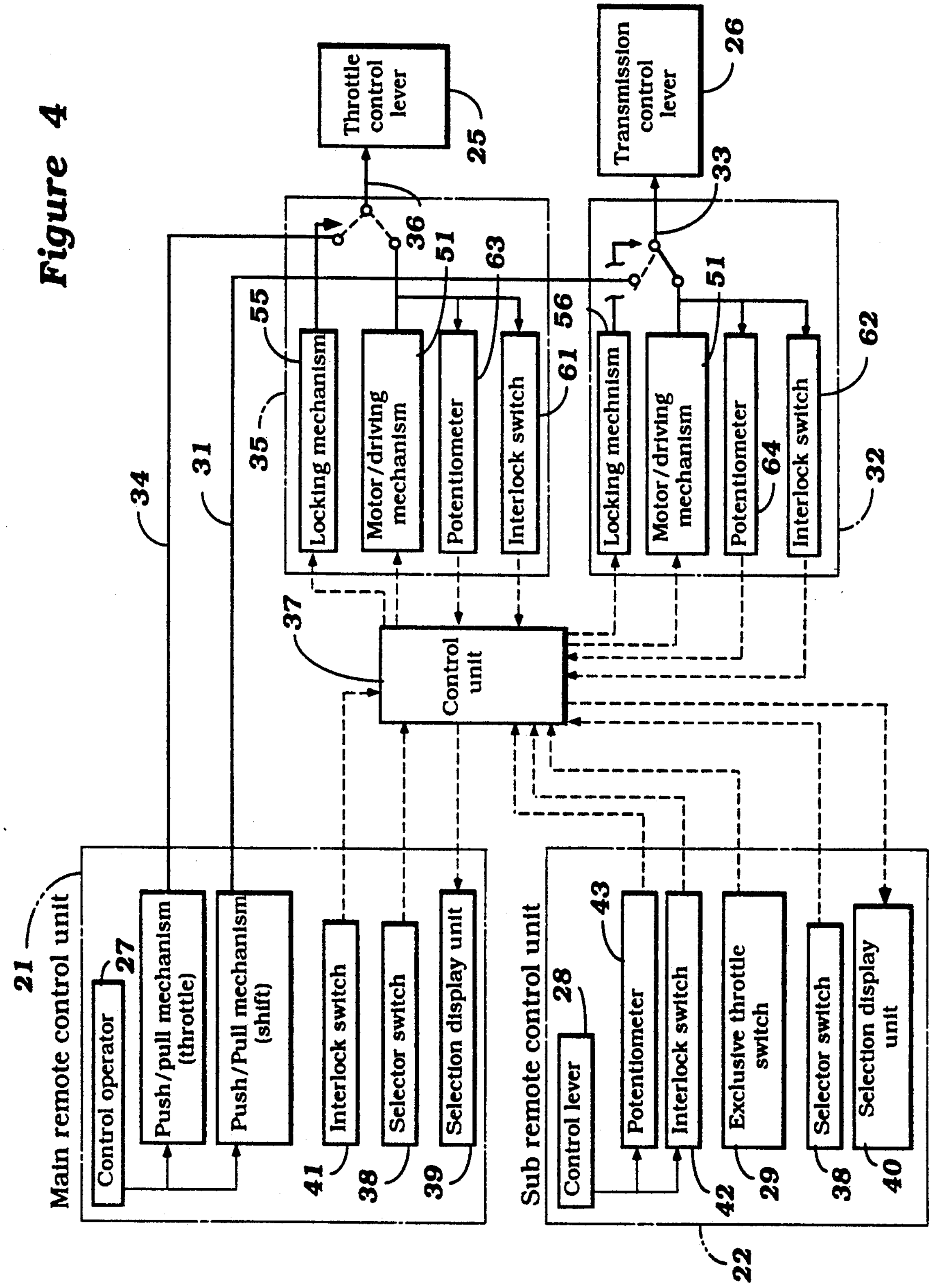
FIG. 4 is a block diagram illustrating the arrangement and operation of the remote control system of FIG. 1.

Referring now to FIGS. 2, 3 and 4, in addition to FIG. 1, the arrangement and operation of the remote control system can be seen. As shown in FIGS. 1 and 4, a selector switch 38 is associated with each of the remote control units 21 and 22. These selector switches 38 are used to select a particular remote control unit 21 or 22 for controlling the throttle and transmission control levers 25 and 26. When a particular selector switch 38 is actuated, the corresponding remote unit 21 or 22 is then selected for control of the levers 25 and 26 and this information is displayed on selection display units 39 and 40, one of which is associated with each remote unit 21 and 22. Upon movement of an operator associated with the selected remote unit 21 or 22, the operator(s) of the non-selected remote unit 21 or 22 is then prevented from overriding the control at the selected remote location 21 or 22 by a corresponding interlock switch 41 or 42, one associated with each remote unit 21 or 22 respectively, as hereinafter described. In the case of the sub-remote control unit 22, the interlock switch 42 interfaces with a potentiometer 43.

When remote unit 21 is selected, movement of operator 27 between a neutral and a forward or reverse drive position effects a push-pull movement on cables 31 and 34 which transmits movement to a manual actuating means of the actuator units 32 and 35 to effect a push-pull movement on actuators 33 and 36 for transmitting movement to the transmission and throttle control levers 26 and 25. Further movement of operator 27 between forward drive positions or between reverse drive positions will only effect movement of cable 34, actuator unit 35 and actuator cable 36 to further adjust the throttle control lever 25.

In contrast, the operators 28 of remote unit 22 are electrically connected to an electric actuating means of the actuator units 32 and 35 through the central control unit 37 so that when unit 22 is selected by the corresponding switch 38 and upon movement of one of the operators 28 between a neutral and a forward or reverse drive position as well as movement for throttle position, electrical signals for shifting and throttling are transmitted to the control unit 37 which, in turn, transmits the signals to the actuator units 32 and 35 to effect a push-pull movement on actuators 33 and 36 for transmitting movement to the levers 26 and 25. Further movement of one of the operators 28 between forward drive positions or between reverse drive positions will only result in the transmission of an electrical signal to actuator unit 35 for further actuation of the throttle control lever 25.

The details of one of the actuator units 35 as well as how it interfaces between the remote units 21 and 22 and the throttle control lever 25 are shown in FIGS. 2 and 3. It should be noted that actuator unit 32, which interfaces between the remote units 21 and 22 and the transmission control lever 26, is of similar construction. As shown in FIGS. 2 and 3, the bowden wire cable 34 includes an outer wire cover that is affixed to a main housing 44 of the actuator unit 35 by means of a mount. An inner wire of cable 34 is slidably supported within this outer wire cover and is affixed at one end to the operator 27 of remote unit 21 and is connected at the other end to a lever arm 45, which forms the manual actuating means and which is pivotally mounted to the main housing 44 by means of a bolt 46.

Actuator cable 36 is also comprised of inner and outer wires 47 and 48 respectively. In this instance, the outer wire 48 is affixed to the lever arm 45 by means of a mount. The inner wire 47 is slidably movable within the outer wire 48 and extends between the throttle control lever 25 and an arm 49. A worm gear assembly is provided and includes a threaded shaft 52 which is coupled for rotation with an electric motor 51 and a wheel 53 with teeth which are enmeshed with the shaft 52. The arm 49, motor 51 and worm gear assembly form the electric actuating means.

With this arrangement, the lever 25 may be manually actuated by pivotal movement of lever arm 45 which then effects a push-pull movement on outer wire 48 upon movement of the operator 27. Alternatively, the lever 25 may be electrically actuated by the electric actuating means and inner wire 47 upon movement of one of the operators 28. In this instance, the motor 51 is operated in response to the electrical signal received from the remote unit 22 to drive the threaded shaft 52 and gear wheel 53. Rotation of gear wheel 53 causes the arm 49 to pivot so as to effect a push-pull movement on inner wire cable 47 which is connected to lever 25. The lever 26 may be actuated in the same manner through the manual and electric actuating means of actuator unit 32.

In order to prevent operation by the non-selected operator(s), a locking mechanism 55 and 56 is associated with each actuator unit 35 and 32 respectively for selectively locking and unlocking the manual and electric actuating means. The locking mechanism 55 of actuator unit 35 is shown in FIGS. 2 and 3 and includes a lock pin 57 which is slidably movable within a bore in the main housing 44 and a correspondingly aligned bore 58 in the lever arm 45 which is positioned above the bolt 46.

When the operator 27 is selected by depressing the corresponding selector switch 38, a solenoid 59 is energized to draw the lock pin 57 into the housing 44 of the actuator unit 35 so that the lock pin 57 is disengaged from the lever arm 45. This releases the lever arm 45 so that it may be manually operated upon movement of the operator 27. Also, when operator 27 is moved, an electrical signal is transmitted from interlock switch 41 to the locking mechanisms 55 and 56 within the actuator units 35 and 32 through the central control unit 37 to lock the worm gear assembly of actuator units 35 and 32 to prevent operation of the marine propulsion unit 24 by operators 28.

When one of the operators 28 is selected, the worm gear assembly of actuator units 35 and 32 are released so that they may be operated by the motor 51. When an operator 28 is moved, interlock switch 42 transmits an electrical signal to the locking mechanisms 55 and 56 via the central control unit 37 to deenergize the solenoid 59 so that the lock pin 57 engages with the lever arm 45 to retain it in the locked position.

Interlock switches 61 and 62 on the actuator units 35 and 32 transmit a feedback signal to the control unit 37 indicative of the state of the locking mechanisms.

Figure 5:
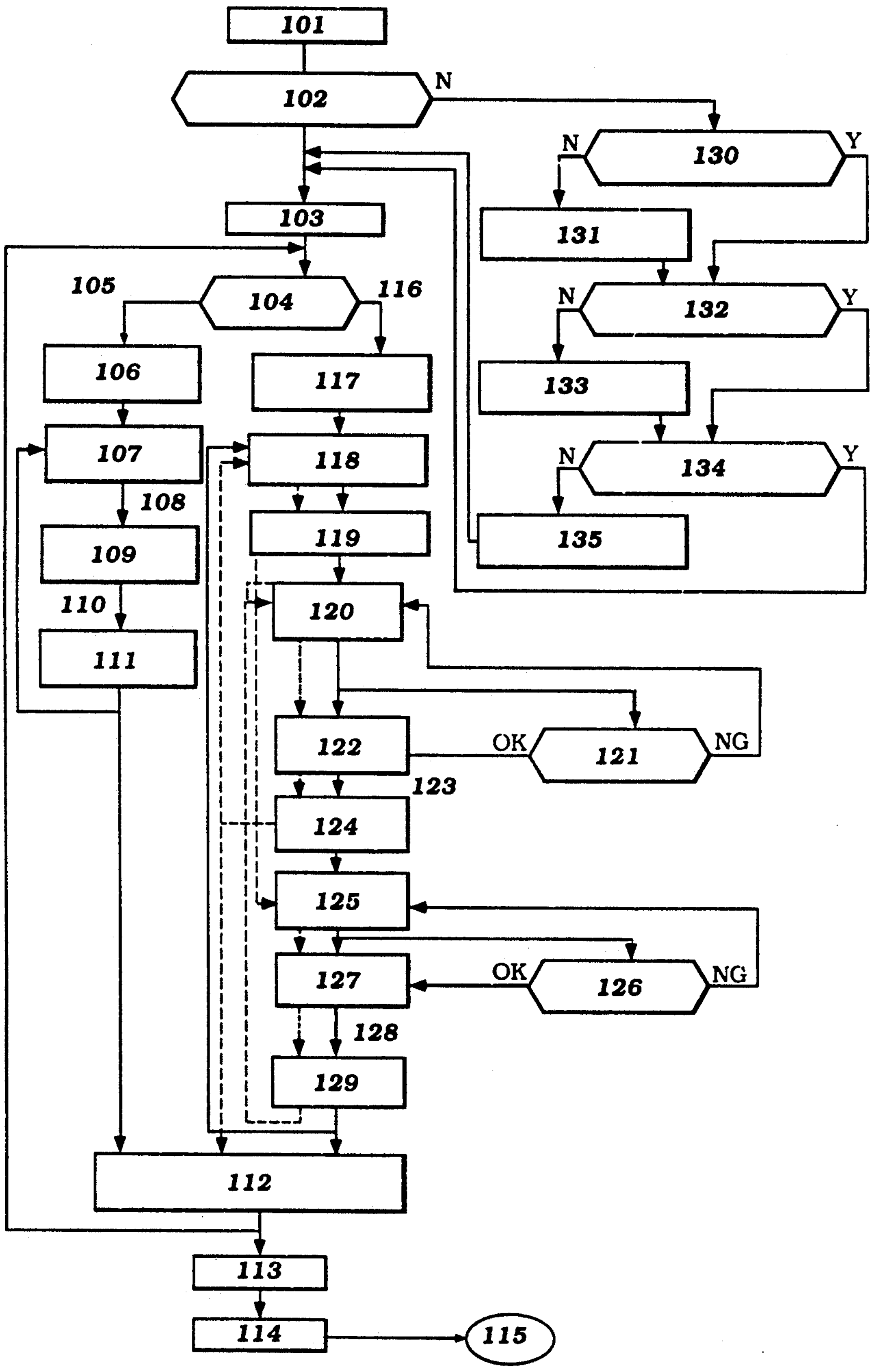
FIG. 5 is a flow chart showing the operation of the remote control system of FIG. 1.

Referring now to FIG. 5, operation of the remote control system is further illustrated by way of a flow chart. Initially at step 101 a determination is made as to whether or not the power is on. If it is, the program proceeds to step 102 where it is determined if the interlock switches are in their initialized positions. If they are, the engine is started in step 103.

Once the engine is started, a selector switch 38 corresponding to one of the remote control units 21 or 22 is actuated in step 104. If manual operation is selected through remote unit 21 and operator 27 (step 105) the lever arms 45 are unlocked (step 106) so that the operator 27 may be moved (step 107). Movement of the operator 27 then causes movement of the cables 31 and/or 34 (step 108) which, in turn, effects pivotal movement of the lever arms 45 of the throttle and transmission actuator units 35 and/or 32 respectively (step 109). As the lever arms 45 move about their pivot points, they will exert a pushing-pulling force on their associated actuators 33 and/or 36 (step 110) so as to actuate the transmission or throttle control lever 26 and/or 25 (step 111).

Prior to shutting off the engine, the control operator 27 is moved to the neutral position (step 112). Thereafter, the engine may be turned off (step 113) and the power turned off (step 114). If that occurs, the program ends at step 115.

Referring back to the juncture where a selector switch 38 is actuated to select a particular remote control unit 21 or 22 (step 104), electric operation of the remote control system may be selected instead of manual operation. In this instance, electric operation is selected through sub-remote unit 22 and operators 28 (step 116), and the worm gear assembly is unlocked (step 117) so that movement of one of the operators 28 (step 118) will actuate the throttle or transmission control levers 25 or 26. Upon initial movement of one of the operators 28, an electrical signal is transmitted to the electric motor 51 of actuator unit 32. As this signal is received, a corresponding potentiometer 64 is displaced (step 119) and transmits a feedback signal to the central control unit 37 indicative of this displacement. At this point, the electric motor 51 associated with the transmission control is energized (step 120) and the displacement of the potentiometer 64 is determined (step 121). If there is no displacement, the program returns to step 120. If, however, a displacement is detected, the program proceeds to step 122 where the electric motor 51 of actuator unit 32 is operated to exert a pushing-pulling movement on bowden wire cable 33 (step 123) which, in turn, actuates the transmission control lever 26 of the marine propulsion unit 24 (step 124).

If further shifting of the transmission control lever 26 is desired, the program returns to step 118. The selected operator 28 can also be moved back to the neutral position in preparation for shutting off the engine, in which case the program returns to step 112

If the selected operator 28 is moved out of the neutral position and into the forward position, for example, further movement of the selected operator 28 within the forward position will not affect the transmission control lever 26 but will cause an electrical signal to be transmitted to the electric motor 51 of actuator unit 35 to energize that motor 51 (step 125). As this signal is received, the corresponding potentiometer 63 is displaced relative to the amount of operator movement and transmits a feedback signal to the central control unit 37 which is indicative of this displacement. This displacement is then determined (step 126). If no displacement is detected, the program goes back to step 125. If, on the other hand, displacement is detected, the electric motor 51 of actuator unit 35 is operated (step 127) to effect a pushing-pulling movement on bowden wire actuator 36 (step 128). This, in turn, actuates the throttle control lever 25 (step 129). At this point, the program may return to step 118 for further movement of the selected operator 28. Alternatively, the program may continue to step 112 where the selected operator 28 is moved to the neutral position in preparation for turning off the engine.

Referring back now to step 102, if the interlock switches are not in their initialized positions, a determination is then made as to whether the actuator units 32 and 35 are in their respective initialized positions (step 130). If they are not, they are initialized in step 131. If they are initialized or after they are initialized, it is determined whether or not operator 27 is in its neutral position (step 132). If it is not, it is moved to that position in step 133. Once the operator 27 is in the neutral position, the same determination is made with respect to the operators 28, that is, whether or not they are in their neutral positions (step 134). If they are not in their neutral positions, they are manually moved to that position in step 135. Once the actuator units 32 and 35, as well as the operators 27 and 28 are initialized or in their neutral positions, the program then continues with step 103.

Figures 6, 7:
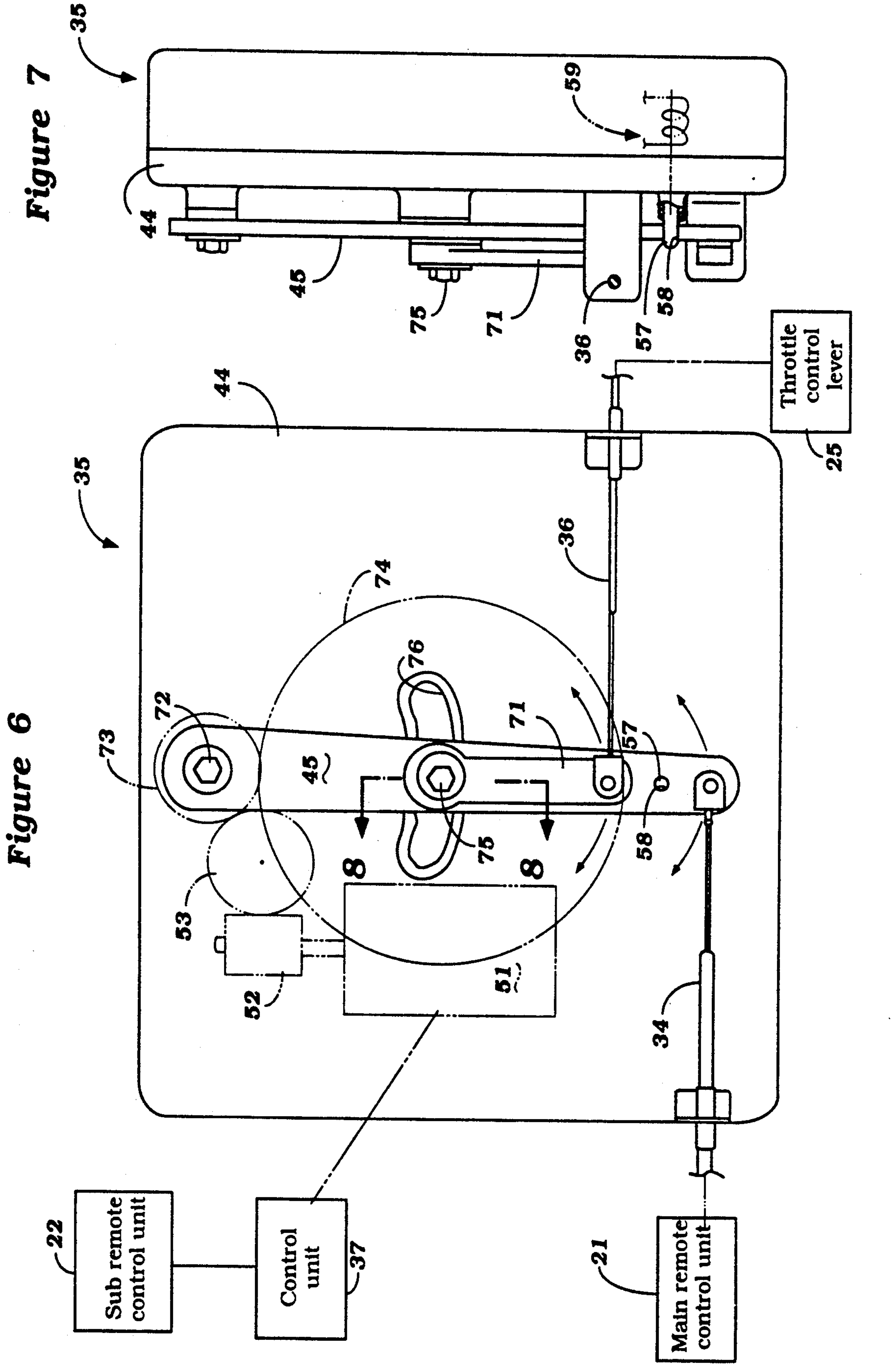
FIG. 6 is a frontal view of a second embodiment of the driving mechanism of the actuator unit.
FIG. 7 is a right side view of the driving mechanism of FIG. 6.
Figure 8:
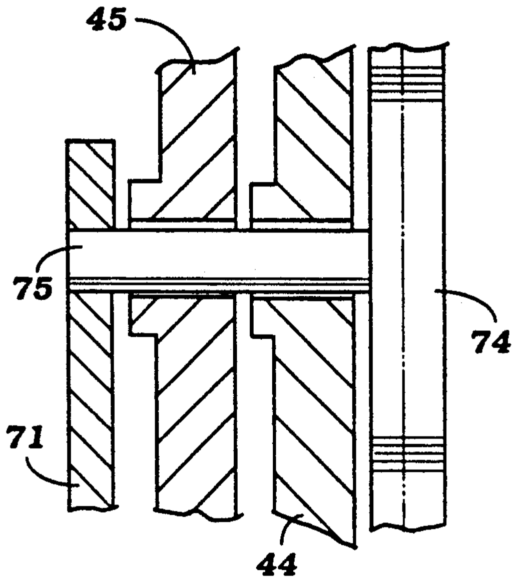
FIG. 8 is a cross sectional view taken along line 8—8 of FIG. 6.

A second embodiment of actuator unit 35 is depicted in FIGS. 6–8. The second embodiment of actuator unit 32, although not shown in these figures, is of similar construction. The actuator unit 35 of the second embodiment is generally similar to the actuator unit 35 described in connection with the first embodiment, and for that reason, components of this embodiment which are the same as components of the first embodiment are identified by the same reference numerals and will not be described again, except insofar as is necessary to understand the construction and operation of this second embodiment.

In this second embodiment, the outer wire of actuator cable 36 is affixed to the main housing by means of a mount. The inner wire of cable 36 is slidably supported within this outer wire cover and is affixed at one end to the throttle control lever 25 and at the other end to a lever arm identified by the reference numeral 71. The lever 25 of this second embodiment may be manually or electrically actuated, as is the case in the first embodiment.

Figure 9:
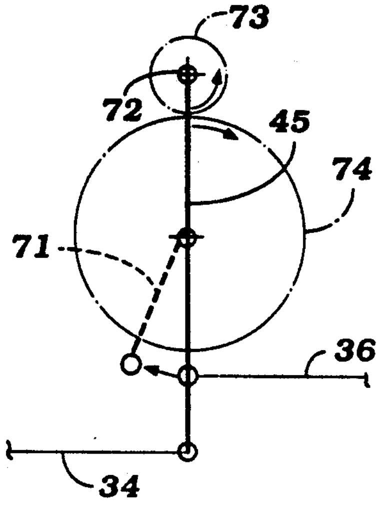
FIGS. 9 and 10 are schematic views of the driving mechanism of the second embodiment, showing the operational states of that driving mechanism.

Actuation of the throttle control lever 25 will now be described with particular reference to FIGS. 9 and 10 in addition to FIGS. 6–8. As in the first embodiment, the operator 27 is used for manual actuation of the lever 25. Movement of the operator 27 exerts a pushing-pulling force on the inner wire of cable 34 which causes the lever arm 45 to pivot about a bolt 72 which extends through a bore in the main housing 44. A gear wheel 73 is supported on the inner end of the bolt 72 within the housing and is adapted so that it will also rotate about the bolt 72 independent of lever arm 45. Gear wheel 73 has teeth on its outer perimeter which are engagable with teeth of a larger gear wheel 74 also contained within the housing 44. This gear wheel 74 is affixed on the inner end of a shaft 75 which extends outwardly through a slot 76 in the main housing 44 and a bore in the lever arm 45 and which rotates with the gear wheel 74. The lever arm 71 is affixed to the outer end of the shaft 75 inside its head portion for rotation with the shaft 75.

Figure 10:
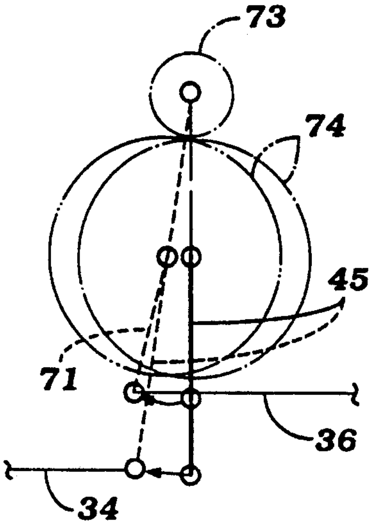

When the operator 27 is moved to a forward position, a pulling force is exerted on the inner wire of bowden wire cable 34, causing the lever arm 45 to pivot in the rearward direction, as illustrated in FIG. 10. Since the shaft 75 extends through the lever arm 45 below its pivot point, the shaft 75 will also move rearwardly and carry with it gear wheel 74, as shown in FIG. 10, so as to engage the rearward end of the slot 76 which defines the degree of pivot of the lever arm 45. Rearward movement of lever arm 45 will also cause the lever arm 71 to pivot rearwardly, exerting a pulling force on the inner wire of the actuator cable 36 to actuate the throttle control lever 25.

If electric actuation of the lever 25 is desired, this is carried out using one of the operators 28, as is the case in the first embodiment. Upon movement of an operator 28, an electrical signal is transmitted to the electric motor 51 of actuator unit 35 through the central control unit 37 as previously described. The electric motor 51 is then operated to rotate the threaded shaft 52 and wheel 53 which is engaged with the shaft 52. As shown in FIG. 6, the wheel 53 is engagable with the gear wheel 73 which, in turn, is engagable with the gear wheel 74. Rotation of the gear wheel 73 will not cause the lever arm 45 to pivot, but instead will drive gear wheel 74 and shaft 75 in the opposite direction. This, in turn, will cause the lever arm 71 to pivot, as shown in FIG. 9, to exert a force on the inner wire cable of actuator cable 36 to actuate the throttle control lever 25.

The locking mechanisms are operated so as to selectively lock and unlock the lever arm 45 and worm gear assembly in the same manner as described with reference to the first embodiment.

Figures 11, 12:
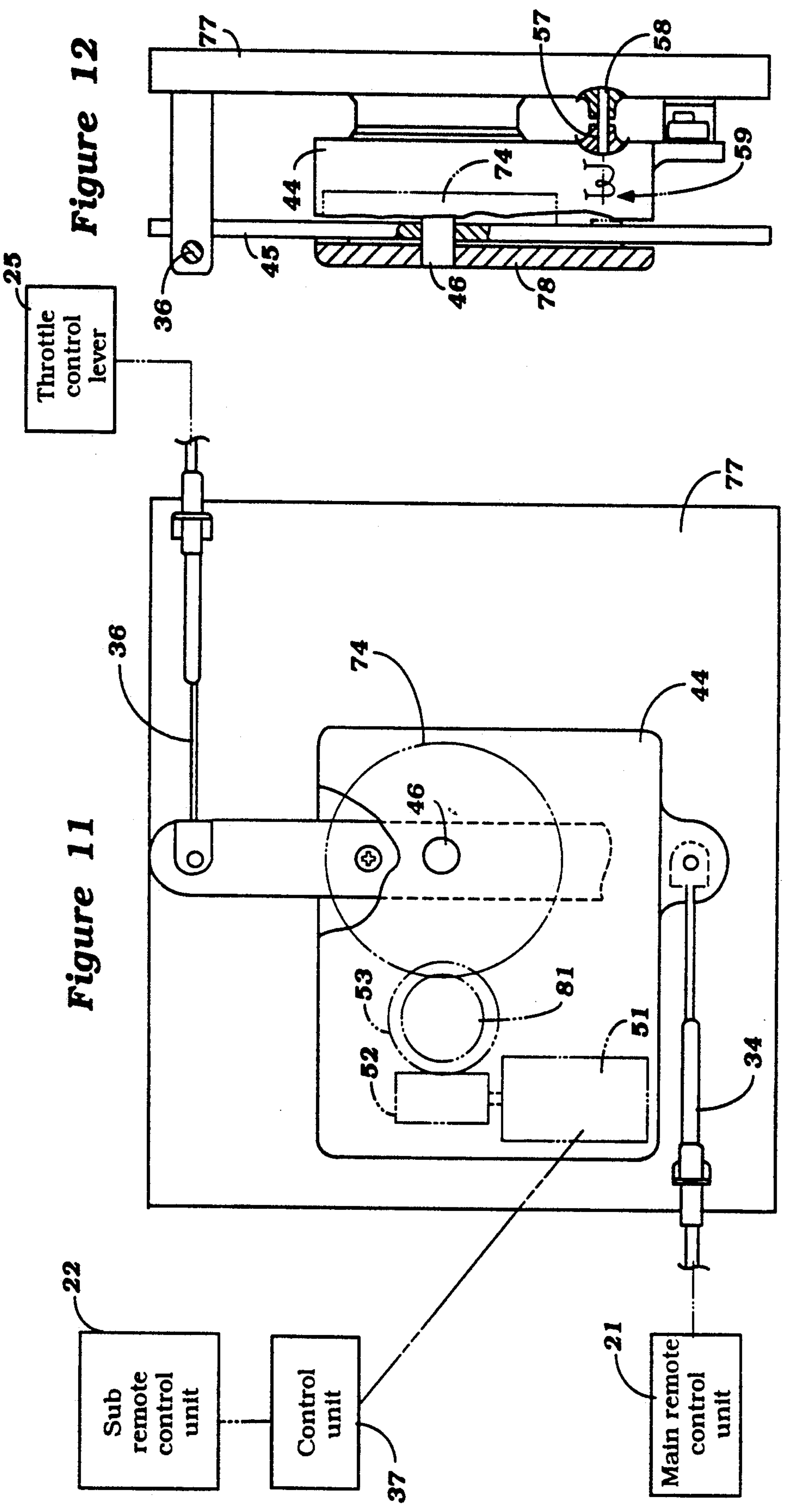
FIG. 11 is a frontal view of a third embodiment of the driving mechanism of the actuator unit.
FIG. 12 is a right side view of the driving mechanism of FIG. 11.

A third embodiment of actuator unit 35 is illustrated in FIGS. 11 and 12. Although not shown, actuator unit 32 is of similar construction. Moreover, the actuator unit 35 of this third embodiment is generally similar to the ones described in connection with the first and second embodiments, and for that reason, components of this embodiment which are the same as components of the first two embodiments are identified by the same reference numerals and will not be described again, except insofar as is necessary to understand the construction and operation of this third embodiment.

In this third embodiment, the outer wires of cables 34 and 36 are mounted to a support member 77. The inner wire of cable 34 extends between the operator 27 of main remote control unit 21 and a protrusion on the main housing 44 while the inner wire of cable 36 interconnects the outer end of the lever arm 45 with the throttle control lever 25. Manual actuation of lever 25 is carried out using the operator 27, as in the other embodiments. Movement of operator 27 exerts a pushing-pulling force on the inner wire of cable 34 which causes the housing 44 to pivot relative to support member 77. In this manual actuation mode, pivotal movement of the lever arm 45 with the housing 44 effects a pushing-pulling movement on the inner wire of cable 36 to actuate the lever 25.

Electric actuation of the throttle control lever 25 is carried out with the motor 51, shaft 52 and gear wheel 53. When the motor 51 is operated, the gear wheel 53 rotates along with another gear 81 which drives gear wheel 74 to cause lever arm 45 which is affixed to gear wheel 74 to pivot, so as to actuate the throttle control lever 25. During electric actuation, the lock pin 57 locks the main housing 44 relative to housing member 77.

From the foregoing description it should be readily apparent that the described remote control system is extremely effective in providing both manual and electric actuating means and at least one remotely positioned operator associated with each for controlling a controlled member, such as a throttle and/or transmission control lever, on a marine propulsion unit. In addition, the described system is extremely effective in insuring that when the propulsion unit is being controlled from one location that control may not be overridden at another location. Although several embodiments of the invention have been illustrated and described, various changes or modifications may be made without departing from the spirit and scope of the invention, as defined by the appended claims.

We claim:

1. A remote control system for transmitting control movement to a controlled member comprising an actuator unit having manual actuating means and electric actuating means both operatively connected to said controlled member, a first remote control unit having a first operator mechanically connected to said manual actuating means for selectively transmitting movement to said manual actuating means upon movement of said first operator, a central control unit, a second remote control unit having a second operator electrically connected to said electric actuating means through said central control unit for selectively transmitting an electrical signal to said central control unit for selectively transmitting movement to said electric actuating means upon movement of said second operator, means for transmitting movement of each of said actuating means into movement of said controlled member, interlock means for precluding operation of said controlled member by one of said operators when the other of said operators is operated, and means for indicating the control state of said operators.

2. A remote control system as recited in claim 1, wherein said manual actuating means comprises a lever arm.

3. A remote control system as recited in claim 1, wherein said electric actuating means comprises an electric motor and a worm gear assembly.

4. A remote control system as recited in claim 1, wherein said interlock means comprises a plurality of interlock switches, and a locking mechanism.

5. A remote control system as recited in claim 1, wherein said indicating means comprises a selection display unit.

6. A remote control system as recited in claim 4, wherein said locking mechanism comprises a solenoid and a lock pin responsive to said solenoid for selectively locking said manual actuating means to preclude operation of said controlled member by said first operator when said second operator is operated.

7. A remote control system as recited in claim 6, wherein said locking mechanism further comprises a worm gear assembly to preclude operation of said controlled member by said second operator when said first operator is operated.

* * * * *